United States Patent [19]
Giamello

[11] Patent Number: 5,862,728
[45] Date of Patent: Jan. 26, 1999

[54] APPARATUS AND METHOD FOR CUTTING FOOD PRODUCTS

[75] Inventor: Bruno Giamello, Alba, Italy

[73] Assignee: Soremartec S.A., Schoppach-Arlon, Belgium

[21] Appl. No.: 874,284

[22] Filed: Jun. 13, 1997

[51] Int. Cl.[6] .................................................... B26D 7/00
[52] U.S. Cl. .............................. 83/13; 83/34; 83/76.8; 83/356.2; 83/756; 83/956; 83/360
[58] Field of Search ................................ 83/13, 34, 38, 83/76.8, 356.2, 756, 771, 772, 956, 358, 360, 367, 369, 370, 76.1, 76.6, 76.7

[56] References Cited

U.S. PATENT DOCUMENTS

| | | | |
|---|---|---|---|
| 3,468,203 | 9/1969 | Armelin et al. | 83/956 |
| 3,680,616 | 8/1972 | Rejsa | 83/38 |
| 4,299,150 | 11/1981 | Huston et al. | 83/356.2 |
| 4,925,515 | 5/1990 | Yoshimura et al. | 83/956 |
| 5,163,865 | 11/1992 | Smith | 83/956 |
| 5,186,089 | 2/1993 | Wadell | 83/76.8 |
| 5,226,334 | 7/1993 | Peroraro | 83/76.8 |
| 5,243,888 | 9/1993 | Bowlin | 83/76.8 |
| 5,437,215 | 8/1995 | Hamilton | 83/956 |

FOREIGN PATENT DOCUMENTS

| | | | |
|---|---|---|---|
| 0543628 | 5/1993 | European Pat. Off. . | |
| 0614733 | 9/1994 | European Pat. Off. . | |
| 1354505 | 5/1974 | United Kingdom | 83/956 |

*Primary Examiner*—M. Rachuba
*Attorney, Agent, or Firm*—Rothwell, Figg, Ernst & Kurz, P.C.

[57] ABSTRACT

The cutting apparatus includes an ultrasound cutting element associated with a drive mechanism which enables the rate of advance of the cutting element through the product being cut to be varied selectively and locally. The preferred application is for cutting layered food products.

14 Claims, 3 Drawing Sheets

APPARATUS AND METHOD FOR CUTTING FOOD PRODUCTS

BACKGROUND OF THE INVENTION

1. Field of the Invention

The present invention relates to a method and an apparatus for cutting food products comprising zones, generally layers, having different cutting characteristics.

2. Description of Related Art

Apparatus of this type is known, for example, from EP-A-0 614 733. This prior art document describes the presence of a pair of cutting devices (ultrasound blades) driven by a rod and crank mechanism on a member which can travel in synchronism with, and so as to follow food products which advance on a conveyor.

This solution constitutes an example of the many conventional solutions used for cutting food products in industrial plants for the manufacture of such products. The operating criteria and types of such apparatus are in fact extremely varied.

The automatic cutting of food products in such a context must take account of a series of factors which are becoming ever more important as conditions.

In the first place, the productional capacities of such plants, and hence the rate at which it is necessary to carry out the cutting, tend to increase continuously.

In the second place, the products treated are often delicate and cannot withstand very violent handling which could damage the product and/or cause the breaking away of fragments, crumbs and particles which can soil the plant itself.

Yet again, many food products have an intrinsically non-homogeneous character in the sense that they are not constituted by a single food substance but rather by a combination of food substances which may be very different from each other: it suffices to think, for example, of filled and/or layered products.

SUMMARY OF THE INVENTION

The object of the invention is to provide an apparatus which is able to satisfy all the requirements explained above in an excellent manner.

According to the present invention this object is achieved by an apparatus having the characteristics of varying the rate of advance of the cutting tool in accordance with different food substances comprising a product. Advantageous developments of the invention further include operating the apparatus to control application of ultrasound to the cutting element and/or to control reciprocal motion of the cutting element with respect to the product in accordance with the portion of a product being cut. The invention also relates to the associated method having the characteristics of moving a cutting element through a product of the type described above in accordance with the type of product component currently being cut. Advantageous developments of this method constitute selectively activating an ultrasonic cutting element for reducing problems stated above.

BRIEF DESCRIPTION OF THE DRAWINGS

The invention will now be described, purely by way of non-limitative example, with reference to the appended drawings, in which.

DESCRIPTION OF THE PREFERRED EMBODIMENTS

Figure 1:
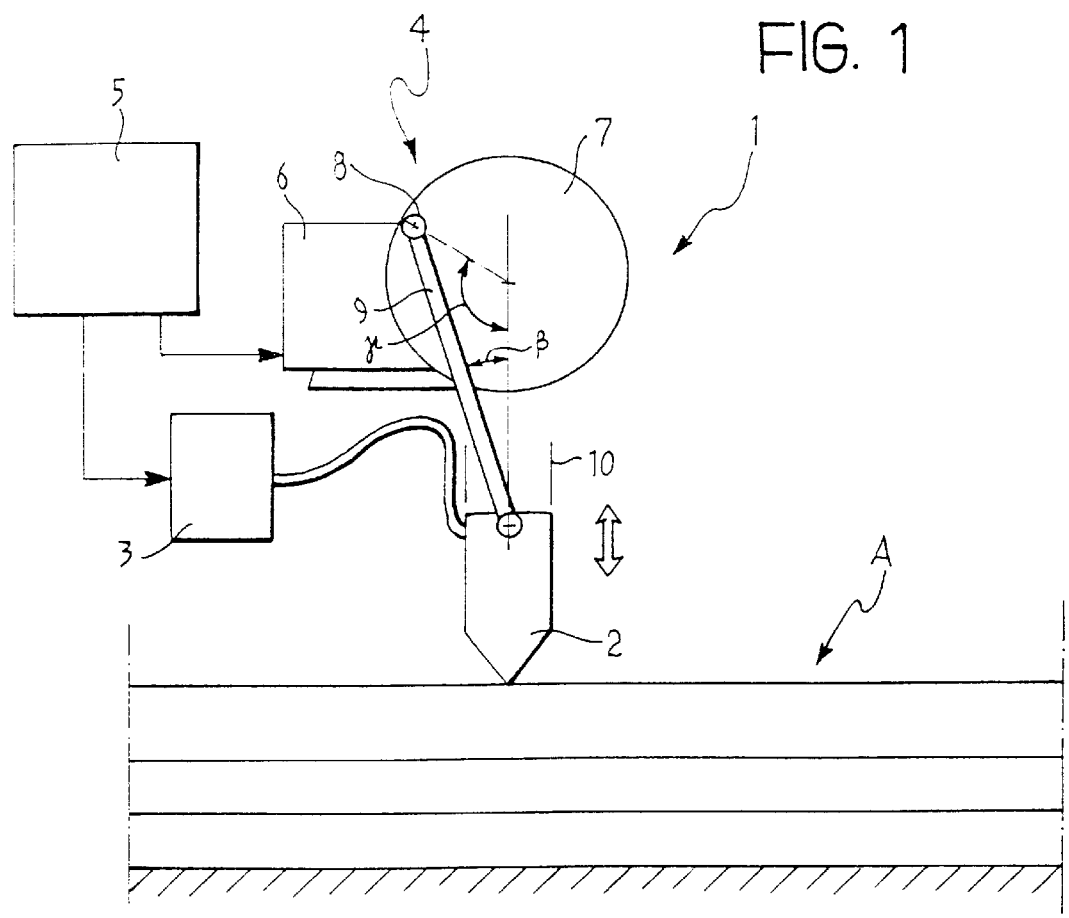
FIG. 1 is a schematic illustration of the structure of cutting apparatus according to the invention.

Cutting apparatus according to the invention, generally indicated 1 in FIG. 1, comprises essentially the following elements:

a cutting element 2 (blade or knife) preferably having a sharp form and a structure typical of the so-called "sonotrode" of an ultrasonic welding or cutting apparatus, a unit 3 (of known type) for generating and conveying ultrasounds which is able to supply a wave front at ultrasonic frequency, that is so-called "ultrasound", to the blade 2 at a frequency typically of the order of 45 Khz, a drive mechanism 4 which imparts a reciprocating movement to the blade 2 (with a selectively regulable velocity as more fully described below) relative to a plane P on which food products A to be cut are arranged and usually advanced (in a manner substantially like that described in EP-A-0 614 733), and a control unit 5 (for example a so-called PLC) which governs the operation of the unit 3 and the drive mechanism 4.

In the embodiment illustrated here, this latter mechanism includes a rotary motor 6, for example an electric motor, which rotates a wheel 7 which carries a crank pin 8 at its periphery. One end of a connecting rod 9 is connected to the pin 8 while its opposite end acts on the blade 2 to reciprocate it along guide elements (indicated schematically at 10) arranged perpendicular to the plane P. This drive mechanism is substantially the same as the crank and connecting rod drive mechanism described in EP-A-0 614 733.

The speed at which the blade 2 follows the double arrow of FIG. 1 as it performs its transitory movement along the vertical guides 10 may be expressed as an equation of the type:

$$Vo = 2\pi Rn \cdot SM(\gamma + \beta) \cos \beta \qquad (1)$$

where $V = 2\pi Rn$ indicates the tangential velocity of the crank pin 8, $\gamma$ indicates the angle at which the connecting rod 9 is inclined to the vertical, that is, to the line of movement of the blade 2, (as stated, it is assumed that, in practice, the center of the wheel 7 is disposed in horizontal alignment with the point at which the connecting rod 9 is articulated to the blade 2), and $\beta$ indicates the angle of inclination of the connecting rod 9, which is assumed to be of length L, again relative to the line of movement of the blade 2, which is vertical.

For precision, the angles $\gamma$ and $\beta$ are those at the base of the triangle having, as its lower vertices, the point including the crank pin 8 on the wheel 7 at which the connecting rod 9 is articulated and the point at which the connecting rod 9 is articulated to the blade 2 and, as its other vertex, the center of the wheel 7. Naturally $2\pi n = \omega$ represents the angular velocity in rad/sec of the shaft wheel 7(n=revs./second).

An examination of equation (1) given above indicates that, if the speed of rotation (n) of the motor 6 is kept constant, the speed of movement of the blade 2 is not in fact constant and does not thus achieve the desired effect of moving the blade 2 as further described below.

In order to achieve this result, it is necessary to control the motor 6 in a manner such that its speed is varied continuously, at least for the length of the useful stroke of the blade 2, so as to keep the speed of movement Vo of the slide constant, that is, so that Vo has the selected relation to Vt, the velocity of advance of food products A.

This result is achieved, in the solution according to the invention of EP 0 614 733 A1, by associating with the motor 6 the electronic control unit 5 (of known type) which senses, by means of an angular detector such as, for example, an encoder associated with the motor 6, the instantaneous angular position (the angle $\gamma$) of the wheel 7, and hence of the connecting rod 9.

Preferably, a speed and position sensor is associated with the means advancing the food products A and—in known manner-enables the electronic control unit 5 to adapt and synchronize (even in phase) the movement of the blade 2 to the movement of the food products A.

In practice, the speed and position sensor may be regulated so as to output a signal corresponding to the value of the angle $\gamma$. The control unit 5 can calculate the value of the angle $\beta$ (naturally, since R and L are known) by means of a simple processing operation (in practice, by means of a control program stored once and for all).

It is thus possible to act on the speed of rotation of the motor 6 in a manner such that Vo (the speed of movement of the blade 2 in the vertical direction) is given a desired value at a desired time. This result can be achieved by controlling the angular velocity $2\pi n$ of the motor in a manner such that $2\pi n = Vt (R \sin(\gamma+\beta) \cos \beta)$.

Theoretically, this equation can be imposed throughout the active movement of the blade 2 when $0° < \gamma < 180°$.

In general, it is more advantageous if the speed of the blade 2 during the initial and final portions of its stroke increases gradually from 0 to the desired value Vo=Vt and then decreases again, also gradually, from Vo to a value of 0 at the end of its useful stroke. It is generally advantageous for the initial acceleration stage to extend over the portion of the following stroke which corresponds to values of the angle $\gamma$ is between 150° and 180°.

The reference to this particular type of drive mechanism should however be considered as purely exemplary in that the solution of the invention lends itself to being carried out with drive mechanisms (drive) for the blade 2 of very different types. To give several examples, one may consider linear drive mechanisms (including a movable member capable of imparting a reciprocating movement to the element 2 relative to the plane P) which is operated hydraulically, electromagnetically, or piezoelectrically, etc. In each case, the constructional details of the drive mechanism 4 for the blade 2 are not in themselves important for the purposes of carrying out the invention.

With reference to the crank and connecting rod mechanism described here by way of example, one may readily appreciate that, if the motor 6 is rotated at a constant angular velocity, the element 2 will move with a harmonic motion relative to the plane P, that is, with a minimum velocity (in practice nil) at the end points, the so-called upper and lower dead points of its travel relative to the plane P, reaching maximum velocity at the median point of its travel. This is true in both directions of movement and, in particular, during its advancing movement, corresponding to its cutting action. It will readily be understood that, in this case, although the velocity of advance of the element 2 varies locally, there is no possibility of varying this velocity selectively as the law governing the change of velocity with time (harmonic motion) is fixed.

The invention is based on a recognition of the fact that the basic requirements called for in the introduction to the specification may be satisfied almost ideally if recourse is made to the use, in combination, of an ultrasound cutting apparatus and a drive mechanism for the cutting element which is able to vary the speed of advance of the cutting element through the product A being cut selectively and locally (virtually point by point, whenever requirements necessitate it and, in any case, according to any law whatsoever, selected according to the applicational requirements).

This is true particularly for the products A having non-homogeneous characteristics in the direction of cutting. Examples of products of this type are given in FIGS. 2 and 4.

In both cases one is dealing with filled products with a layered structure.

Figure 2:
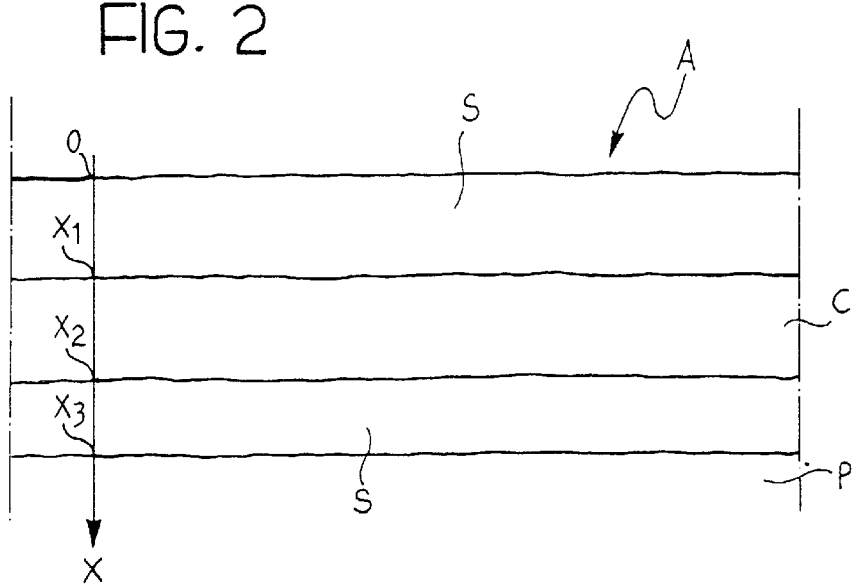
FIG. 2 illustrates the structure of a first food product which can be cut by an apparatus according to the invention.

For example, FIG. 2 shows a portion of a food product A including two layers of sponge S (possibly moistened with a sugar- or alcohol-based syrup) between which is a layer C of a creamy filling or paste constituted, for example, by a milk-flavoured cream.

Figure 4:
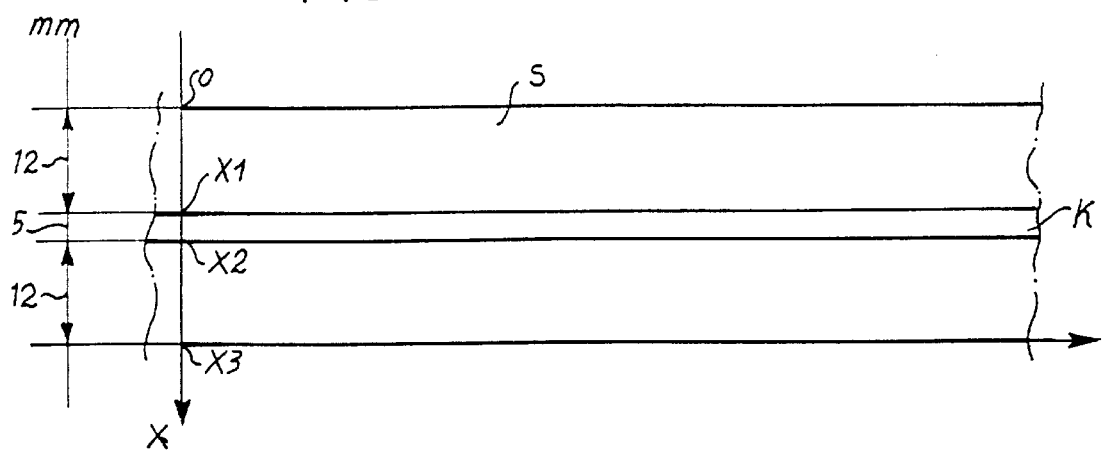
FIG. 4 illustrates the structure of another food product which can be cut by the apparatus of the invention, FIG. 5 graph illustrating the mode of operation the apparatus of the invention during the cutting of the product illustrated in FIG. 4.

The product A illustrated in FIG. 4, on the other hand, comprises an intermediate layer K of chocolate, mou (caramel) or like substance which is, on the whole, rather solid, interposed between two sponge layers S.

Stated in other words, the two situations shown in FIGS. 2 and 4 are exactly complementary to each other. Indeed, in the product A of FIG. 2, a generally "soft" layer C is interposed between the sponge layers S. In the case of the product A of FIG. 4, however, a generally "hard" layer K is interposed between two sponge layers.

The two examples of FIGS. 2 and 4 have been chosen appositely to illustrate two complementary situations. In any case, there is a practically infinite number of cases both with regard to products having fewer layers (for example, only two layers) and articles having more layers (which is the more frequent case): for example, as an illustration, a product such as that illustrated in FIG. 2 having an upper coating of chocolate possibly with a granular material, such as chopped hazelnuts, shredded coconut, etc within it.

The cutting systems most frequently used in the food sector, particularly in the confectionery sector, make use of mechanically-driven cutting elements, the automatic operation of which is designed to reproduce the cutting action that a baker or pastry chef can achieve with a kitchen knife or similar tool such as a bread knife.

Experiments carried out by the applicant have shown, however, that these conventional solutions run the risk of being largely unsatisfactory for various reasons.

For example, when a product A such as that illustrated in FIG. 2 is cut with a purely mechanical action and it is wished to carry out the cutting extremely rapidly (one is talking of automatic cutters intended to operate in plants in which one is attempting to achieve as high an operating rate as possible), one of the more considerable risks is that of causing undesirable squashing of the soft filling layer C with the consequent possibility of the filling C spreading over the sides of the product, which is usually in the form of a "mat" of finite transverse dimensions (the so-called "squish" effect).

If one attempts to limit this "squish" effect while using conventional systems by advancing the blade slowly throughout the cutting operation, this does indeed avoid the squeezing out of the soft filling C, but the cutting operation is slowed considerably, with the consequent need to reduce the production rate.

Then for the "hard" layers, in addition to the possible squeezing of underlying softer layers, give rise to the further risk that, with too quick a movement down through this layer, it might splinter and form fragments and crumbs.

Experiments carried out by the applicant have shown that—in a wholly unexpected manner—the use of an ultrasound cutting element with a rate of advance that is variable selectively has shown to be beneficial both in relation to "soft" layers and in relation to "hard" layers. Even though the reasons for this are not entirely clear, one may hypothesise that, in the presence of "hard" layers, such as a layer of chocolate or like product, the ultrasound cutting element and the vibrational wave front propagated therefrom impinges on the layer to be cut so as to destructure it and hence separate it along the desired cutting line, slightly downstream (in the direction of advance) of the cutting element proper. In other words, the substance being cut starts to separate, and in f act separates, along the desired cutting line even before it is in fact acted on by the mechanical cutting action proper of the cutting element itself. This fact has been verified systematically by the Applicant, noting that improved cutting results occur when the ultrasound generator 3 (it is not usually activated continuously in order to avoid undesirable ultrasonic noise):

is activated slightly before the tip of the cutting element 2 actually touches the product A in its advance towards the product A, that is, when the element 2 is still a certain distance away from the product A, and/or when the generator 3 is deactivated slightly before the cutting element 2 has terminated its advance towards the plane P on which the product A rests, that is, when the element 2 is still a certain distance from the point P.

Even though it is difficult to provide absolute indications in this respect, the term "a certain distance" should be understood, with reference to usual thicknesses of food products such as confectionary items subjected to cutting (typical thicknesses are from 1 to 3 cm approximately), as relating to magnitudes of the order of a millimetre/several millimetres.

With regard to the "soft" layers, the fact that the cutting element 2 is an ultrasound element has been found to be beneficial in that, with every probability of a microscopic shaking effect, the effects of adhesion of the material being cut to the cutting element 2 itself are minimised and virtually eliminated. This is true even for very adhesive or sticky materials, such as some food fillings (for example jam, icings, etc).

In a combined and synergic manner, the fact that there is virtually point control of the rate of advance of the cutting element 2 enables this rate to be adapted to the characteristics of the layer being cut at any time, that is, in other words, the rate of advance of the ultrasound cutting element 2 can be varied locally in dependence on the local characteristics (whether the layer is more or less hard or soft) of the product A in the zone (layer) cut at the moment.

A first result of this is that, in general, it is possible to advance quickly during the cutting of "soft" layers and slowly during the cutting of "hard" layers, thus without penalising the overall duration of the cutting operation as occurs in conventional systems where the rate of cutting is selected to be the minimum of those allowable for the various layers to be cut.

Figure 3:
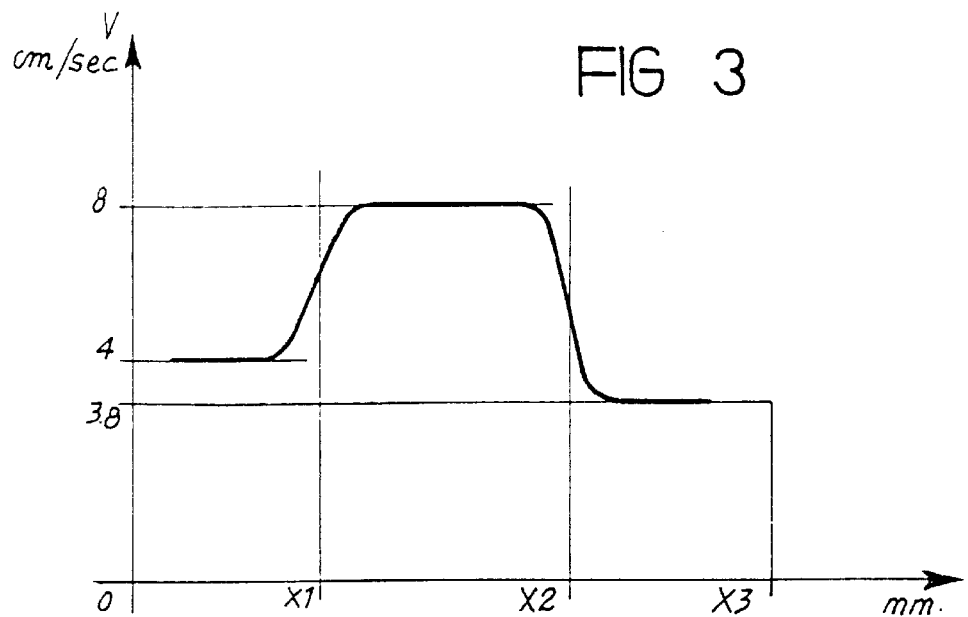
FIG. 3 is a graph illustrating the mode of operation of the apparatus according to the invention during the cutting of the product illustrated in FIG. 2.
Figure 5:
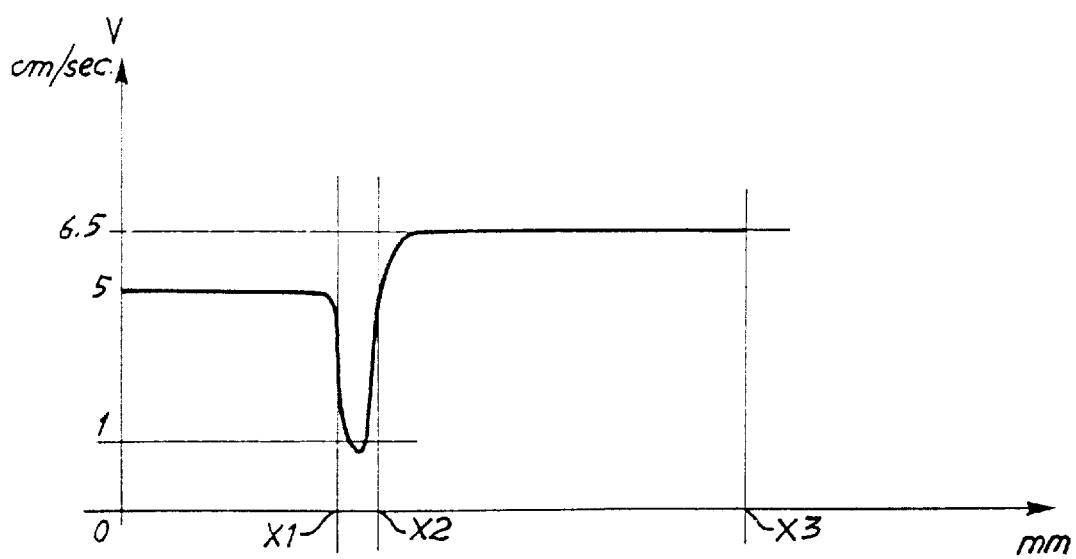

Experiments carried out by the applicant have shown, however, that the criterion described above is not absolute and, in any case, the law of advance of the cutting element 2 through the product A must be determined experimentally according to the characteristics of a product under consideration at any time. For example, the graphs of FIGS. 3 and 5 show, on the ordinates, the rates of advance (in cm/sec.) which have been shown to be optimum during the cutting of the products A shown in FIGS. 2 and 4 respectively. In both of the graphs of FIGS. 3 and 5, the scale on the abscissa is given in centimetres of thickness of the product A, with the zero corresponding to the upper surface of the product, the points $X_1$ and $X_2$ corresponding to the interfaces between the various layers and the point $X_3$ corresponding to the plane P.

By way of example, the graph of FIG. 3 relates to experiments carried out on a product for which $X_1$, $X_2$, and $X_3$ correspond to values of 5, 10 and 15 mm respectively. In the graph of FIG. 4, the respective values are 12, 17 and 29 mm on the other hand.

From an examination of FIGS. 3 and 4 it may be noted, for example, that the law of variation of the rate of advance of the cutting element 2 in the case of FIG. 5 is not only different but in fact is quite the opposite of that achievable by operation of the motor 6 at a constant angular velocity. Another interesting fact is that (for reasons not yet fully clarified) structurally identical layers, such as the sponge layers S are cut in an optimum way at different speeds according to their positioning within the layered structure of the product. Again, it has been noted that it is advisable to avoid a sharp change in the rate of advance at the interfaces $X_1$, $X_2$ between the superposed layers in order to avoid any damage to the product. The changes between the various rates of advance are thus made (according to criteria known in the art of automatic control) in accordance with laws of connection, for example of the type currently defined "at $sine^2$".

Figure 6:
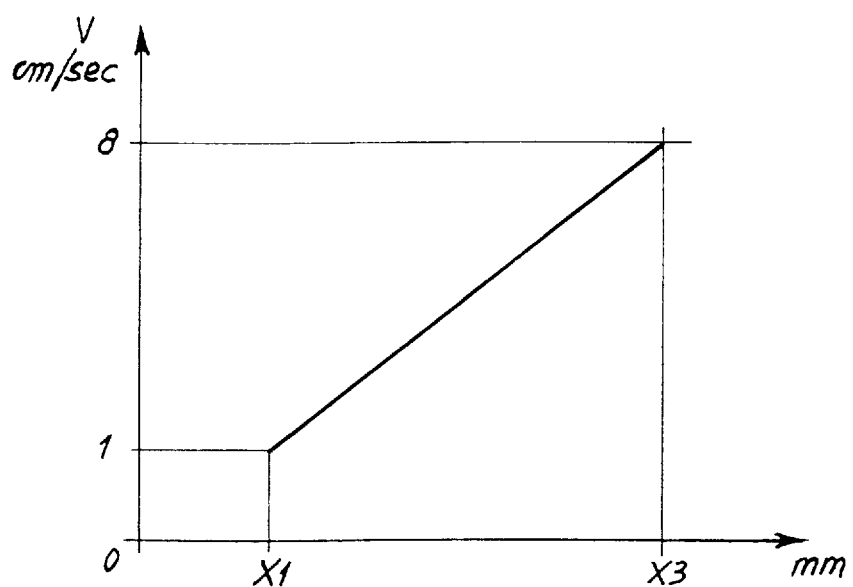
FIG. 6 illustrates a possible variant of the mode of operation referred to in FIG. 5.

The graph of FIG. 6 however is intended to show how, for a given product structure, the optimum laws of variation of the cutting rate could change even significantly. For example, the graph of FIG. 6 corresponds to the law of variation which has been found to be the optimum for a product such as that of FIG. 4 in which $X_1$=5 mm and $X_3$=28 mm. In this case it has been found that it is necessary to proceed very slowly (approximately 1 cm/s) at the beginning, when it is necessary to cut the sponge S while at the same time avoiding squashing the product. Subsequently it is possible to increase the rate of cutting gradually, recovering the delay which has accumulated from the slow cutting during the initial phase.

EP-A-0 614 733 describes in detail how a motor, such as the motor 6 can be piloted selectively so as to vary selectively the velocity of an element driven by the motor itself through a rod and crank mechanism, for example to drive this element at a constant velocity.

In more general terms, in the embodiment illustrated here, the operational link between the rate of rotation $V_r=2\pi n$ (rad/sec) of the motor 6 and the linear velocity of movement $V_t$ of the blade 2 can be expressed by the equation $$2\pi n = V_t/(R\sin(\gamma+\beta)\cos\beta) \qquad (I)$$

where:
R=radius of the path of the pin of the connecting rod 8,
γ=crank angle (cfr. FIG. 1), and π=connecting rod angle (cfr. FIG. 1 again).

The formula (I) given above shows, however, that, for each value of γ and β (values detectable in known manner by sensors), and hence for each instantaneous position reached by the blade 2 relative to the plane P, it is possible to vary the angular velocity of the motor 6 selectively so as to impart a selectively determined velocity to the blade 2. All this may be achieved, according to criteria known per se, through suitable programming of the control unit 5. The associated constructional and programming details are well known per se to experts in the art (particularly in the programming of PLCs) and do not need to be explained here in detail, especially since they are not relevant for the purposes of an understanding of the invention.

Naturally, the principle of the invention remaining the same, the constructional details and forms of embodiment may be varied widely with respect to that described and illustrated, without thereby departing from the scope of the invention.

What is claimed is:

1. Apparatus for cutting food products which are oriented and advanced in a first direction substantially within a plane, said food products having non-homogeneous characteristics in a direction of cutting comprising a second direction in a direction which intersects the plane, said product being comprised of a plurality of zones, each zone having a substantially homogenous characteristic, said apparatus including: a cutting element; an ultrasound source associated with said cutting element; a drive mechanism for providing a selected form of movement with respect to the plane; a control unit for governing the operation of the ultrasound source and the drive mechanism, said control unit comprising means for storing experimentally determined data for a predetermined product for defining rate of motion of said cutting element through said product in said cutting direction, each defined rate of motion in the cutting direction being selected as appropriate for the zone to be cut, and operating said cutting means in accordance with said data to cut through each successive zone.

2. Apparatus according to claim 1 wherein said control unit comprises means for commanding selectively activating said ultrasound source to enable said cutting element to operate in an ultrasound mode prior to contacting a preselected zone.

3. Apparatus according to claim 2 wherein said control unit comprises means for commanding selectively deactivating said ultrasound source prior to completion of cutting a preselected zone.

4. Apparatus according to claim 1 wherein said drive mechanism comprises a connecting rod transmitting for to said cutting element, a crank diving said connecting rod and a rotating mover driving said crank and further wherein said control unit comprises means for determining angular velocity of said rotary mover in according with a characteristic of a preselected zone.

5. Apparatus according to claim 3 wherein said drive mechanism comprises a connecting rod transmitting for to said cutting element, a crank diving said connecting rod and a rotating mover driving said crank and further wherein said control unit comprises means for determining angular velocity of said rotary mover in according with a characteristic of a preselected zone.

6. Apparatus according to claim 4 wherein said product consists of substantially parallel horizontal zones and said drive mechanism is configured to drive said cutting element in vertical reciprocal motion.

7. Apparatus according to claim 1 wherein said ultrasound source operates said cutting element at a frequency of around 45 kHz.

8. Apparatus according to claim 6 wherein said ultrasound source operates said cutting element at a frequency of around 45 kHz.

9. A method for cutting food products with an ultrasound cutting element, said products being oriented and advanced in a first direction substantially within a plane, said food products having non-homogeneous characteristics in a direction of cutting comprising a second direction in a direction which intersects the plane, said product being comprised of a plurality of zones, each zone having a substantially homogenous characteristic, comprising the steps of: selecting a law of motion for a preselected product for advancing said cutting element selectively through successive zones of the product being cut; varying selectively the advance of the cutting element through the product in accordance with the law in accordance with a corresponding characteristics of a zone currently being cut.

10. A method according to claim 9 wherein the step of advancing said cutting element further comprises selectively activating said ultrasound source to enable said cutting element to operate in an ultrasound mode prior to-contacting a preselected zone.

11. A method according to claim 10 wherein step of advancing said cutting element further comprises selectively deactivating said ultrasound source prior to completion of cutting a preselected zone.

12. A method according to claim 11 wherein said product consists of substantially parallel horizontal zones and said cutting element is driven in vertical reciprocal motion.

13. A method according to claim 12 in which said cutting element is driven be a rotary mover and further comprising the step of varying the angular velocity of said rotary mover in accordance with the law in accordance with a corresponding characteristics of a zone currently being cut.

14. A method according to claim 13 wherein step of enabling said cutting element to operate in an ultrasound mode comprises operating said cutting element at a frequency of around 45 kHz.

* * * * *

UNITED STATES PATENT AND TRADEMARK OFFICE
CERTIFICATE OF CORRECTION

PATENT NO. : 5,862,728
DATED : January 26, 1999
INVENTOR(S) : Bruno Giamello

It is certified that error appears in the above-identified patent and that said Letters Patent is hereby corrected as shown below:

On the title page, please add --[30]Forieign Application Priority Data:
June 17,1996 [CH] Switzerland.........1505/96--;

column 5, line 24, "in f act" should be --in fact--.

Signed and Sealed this

Fifteenth Day of June, 1999

Attest:

Q. TODD DICKINSON

Attesting Officer

Acting Commissioner of Patents and Trademarks